United States Patent
Hélot et al.

(10) Patent No.: US 9,783,123 B2
(45) Date of Patent: Oct. 10, 2017

(54) METHOD FOR OPERATING A HOLDING FIXTURE, A HOLDING FIXTURE AND A MOTOR VEHICLE HAVING A HOLDING FIXTURE

(71) Applicant: Audi AG, Ingolstadt (DE)

(72) Inventors: Jacques Hélot, Ingolstadt (DE); Ulrich Weiβ, Kosching (DE); Immo Redeker, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/302,658

(22) PCT Filed: Oct. 17, 2015

(86) PCT No.: PCT/EP2015/002055
§ 371 (c)(1),
(2) Date: Oct. 7, 2016

(87) PCT Pub. No.: WO2016/070955
PCT Pub. Date: May 12, 2016

(65) Prior Publication Data
US 2017/0028934 A1    Feb. 2, 2017

(30) Foreign Application Priority Data
Nov. 3, 2014    (DE) .................... 10 2014 016 434

(51) Int. Cl.
*B60R 11/02*    (2006.01)
*B60K 35/00*    (2006.01)
(Continued)

(52) U.S. Cl.
CPC .......... *B60R 11/0241* (2013.01); *B60K 35/00* (2013.01); *B60R 11/02* (2013.01);
(Continued)

(58) Field of Classification Search
CPC .. B60R 7/04; B60R 7/046; B60R 7/06; B60R 11/02; B60R 11/0211; B60R 11/0235;
(Continued)

(56) References Cited

U.S. PATENT DOCUMENTS 5,889,671  A      3/1999   Autermann et al.
9,216,701  B2 *  12/2015   Kato .................... B60R 11/0235
(Continued)

FOREIGN PATENT DOCUMENTS

CN    101228046 A    7/2008
CN    203567717 U    4/2014
(Continued)

OTHER PUBLICATIONS

English-language abstract of German Patent Application Publication No. 102005021105 A1, published Nov. 9, 2006; 1 page.
(Continued)

*Primary Examiner* — Jason S Daniels
(74) *Attorney, Agent, or Firm* — Sterne, Kessler, Goldstein & Fox P.L.L.C.

(57) ABSTRACT

The invention relates to a method having the steps: determining whether a mobile device is inserted into a receptacle slot of a motor vehicle component; after the mobile device is inserted into the receptacle slot, controlling a drive unit to move the mobile device into a stowed position; after a predetermined condition of the vehicle has been detected, controlling the drive unit to move the mobile device from the stowed position into a removal position in which the mobile device protrudes farther out of the receptacle slot than it does in the stowage position. The invention also relates to a holding fixture for at least one mobile device as well as a motor vehicle having a holding fixture.

12 Claims, 6 Drawing Sheets

(51) Int. Cl.
*B60R 16/023* (2006.01)
*B60R 16/03* (2006.01)
*H02J 7/00* (2006.01)
*B60R 11/00* (2006.01)

(52) U.S. Cl.
CPC ........ *B60R 11/0252* (2013.01); *B60R 16/023* (2013.01); *B60R 16/03* (2013.01); *H02J 7/0045* (2013.01); *B60K 2350/307* (2013.01); *B60R 2011/0021* (2013.01); *B60R 2011/0075* (2013.01); *B60R 2011/0092* (2013.01); *B60R 2011/0094* (2013.01)

(58) Field of Classification Search
CPC ............. B60R 11/0241; B60R 11/0252; B60R 11/0258; B60R 16/03; B60K 35/00
USPC ............................. 296/37.8, 37.12; 710/303
See application file for complete search history.

(56) References Cited

U.S. PATENT DOCUMENTS

| | | | |
|---|---|---|---|
| 2004/0186632 | A1* | 9/2004 | Arai ........................ B60K 35/00 701/1 |
| 2006/0277555 | A1 | 12/2006 | Howard et al. |
| 2010/0124005 | A1 | 5/2010 | Hotary et al. |
| 2010/0244505 | A1* | 9/2010 | Demick ............... B60N 2/4876 297/188.04 |
| 2014/0223065 | A1 | 8/2014 | Jolda et al. |
| 2015/0343963 | A1* | 12/2015 | Angeletti ............ B60R 11/0241 296/37.12 |

FOREIGN PATENT DOCUMENTS

| | | | |
|---|---|---|---|
| DE | 4302947 | A1 | 8/1994 |
| DE | 19624027 | A1 | 12/1997 |
| DE | 19907003 | A1 | 8/2000 |
| DE | 19957252 | A1 | 5/2001 |
| DE | 10141190 | A1 | 4/2003 |
| DE | 10305648 | A1 | 8/2004 |
| DE | 102005021105 | A1 | 11/2006 |
| DE | 102011109056 | A1 | 1/2013 |

OTHER PUBLICATIONS

English-language abstract of German Patent Application Publication No. 10141190 A1, published Apr. 3, 2003; 1 page.
English-language abstract of German Patent Application Publication No. 19957252A1, published May 31, 2001; 1 page.
English-language abstract of German Patent Application Publication No. 19907003 A1, published Aug. 24, 2000; 1 page.
English-language abstract of European Patent Application Publication No. 0610985 A2, published Aug. 17, 1994; 1 page.
English-language abstract of German Patent Application Publication No. 10305648 A1, published Aug. 26, 2004; 2 pages.
English-language abstract of German Patent Application Publication No. 102011109056 A1, published Jan. 31, 2013; 1 pages.
International Search Report and Written Opinion directed to related International Patent Application No. PCT/EP2015/002055, dated Jan. 12, 2016, with attached English-language translation; 21 pages.
International Preliminary Report on Patentability directed to related International Patent Application No. PCT/EP2015/002055, dated Aug. 3, 2016, with attached English-language translation; 12 pages.
English-language abstract of Chinese Patent Application Publication No. 101228046 A, published Jul. 23, 2008; 1 page.
English-language abstract of Chinese Patent Application Publication No. 203567717 U, published Apr. 30, 2014; 2 pages.
English-language abstract of German Patent Application Publication No. 102011109056 A1, published Jan. 31, 2013; 1 page.

* cited by examiner

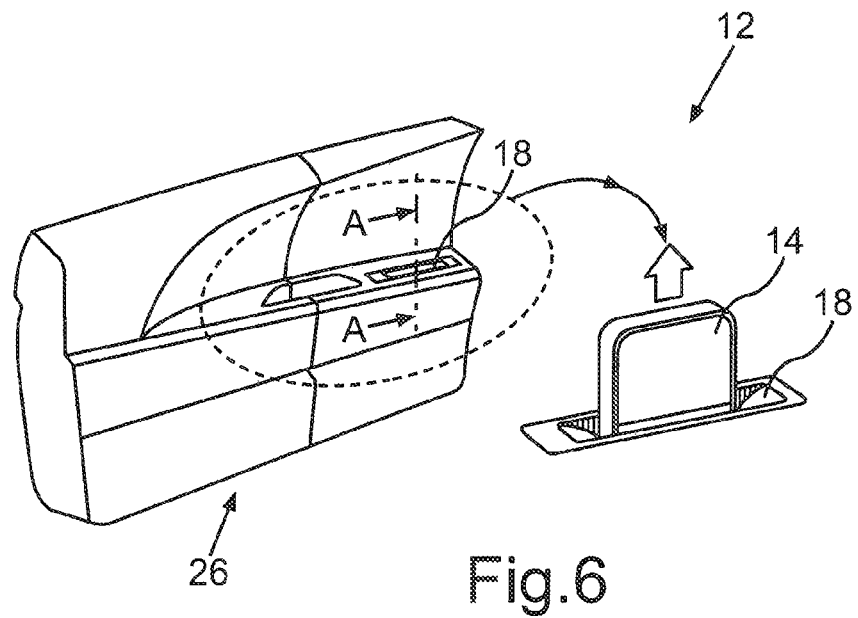
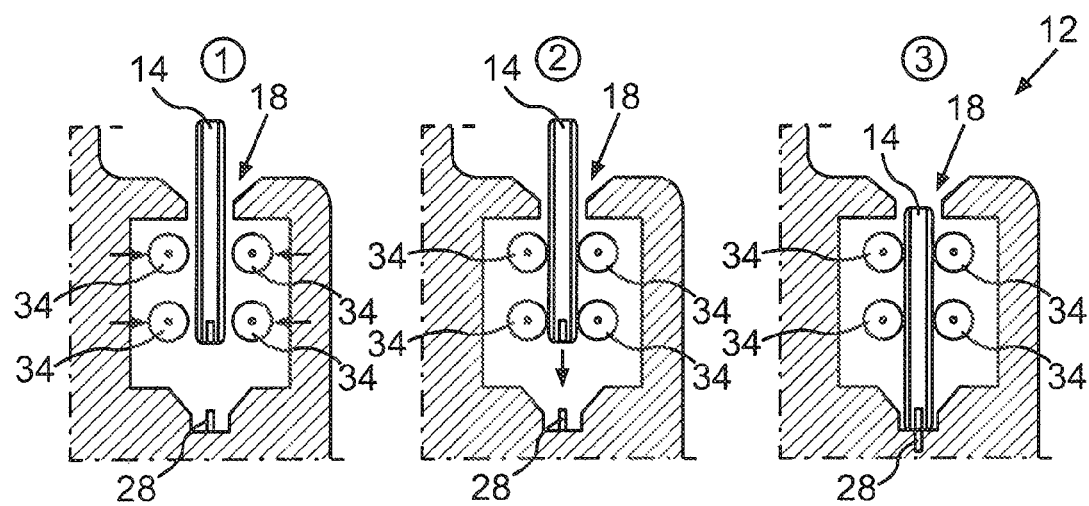

METHOD FOR OPERATING A HOLDING FIXTURE, A HOLDING FIXTURE AND A MOTOR VEHICLE HAVING A HOLDING FIXTURE

TECHNICAL FIELD

The invention relates to a method for operating a holding fixture. The invention also relates to a holding fixture. In addition, the invention relates to a vehicle having such a holding fixture.

BACKGROUND

The use of mobile devices, such as smart phones, tablets and the like in motor vehicles is increasing in importance. To allow data exchange between such devices and motor vehicles, the provision of so-called coupling boxes inside of the motor vehicle is well-known, in which a smart phone can be positioned and charged using a cable. The disadvantage is that the mobile device is not secured within the motor vehicle. It is located, for example, in a compartment and can slide back and forth, especially during sporty driving. For charging, it is also additionally necessary to connect the mobile device with a cable that is connected to an energy source in the motor vehicle. This, in turn, requires additional actions on the part of the vehicle's occupants. Beyond that, such compartments are not customized to the respective format of the mobile device in use and the cable arranged in such a compartment also gives a rather untidy impression.

DE 10 2005 021 105 A1 shows a holding device for mounting a mobile telephone or a mobile computing device in a motor vehicle. The holding device for mounting a mobile telephone and/or a mobile computing device in a motor vehicle includes a frame structure into which the mobile telephone and/or the mobile computing device can be placed and which completely surrounds the mobile telephone and/or the mobile computing device at its outer periphery. In addition, the holding device includes an automatic intake mechanism, by which the mobile phone or mobile computing device, after being introduced, is placed in an activation position within the holding device.

DE 10 141 190 A1 shows a docking station arranged in a motor vehicle that is integrated in a console of the motor vehicle. The docking station has a slide-in frame for holding a mobile device.

DE 19 957 252 A1 shows an electronic installation device for a motor vehicle which has multiple electronic assemblies, at least one of the electronic components being accessible and replaceable from the outside. This is achieved by the housing of the electronic installation device including a recess having at least one slot accessible from the outside.

DE 19 907 003 A1 shows a system box for use in motor vehicles. The system box includes several system partitions for holding individual functional units, such as a laptop computer, a printer, a scanner or other office devices.

BRIEF DESCRIPTION OF THE DRAWINGS/FIGURES

FIG. 6 illustrates a perspective view of a motor vehicle door, where the receptacle slot of the holding fixture in the embodiment shown here is integrated into the motor vehicle door.

FIG. 7 illustrates a sectional view of the holding fixture shown in FIG. 6, where the smart phone is again shown being inserted into the receptacle slot, being moved into the receptacle slot and in its stowage position.

DETAILED DESCRIPTION

Figure 1:
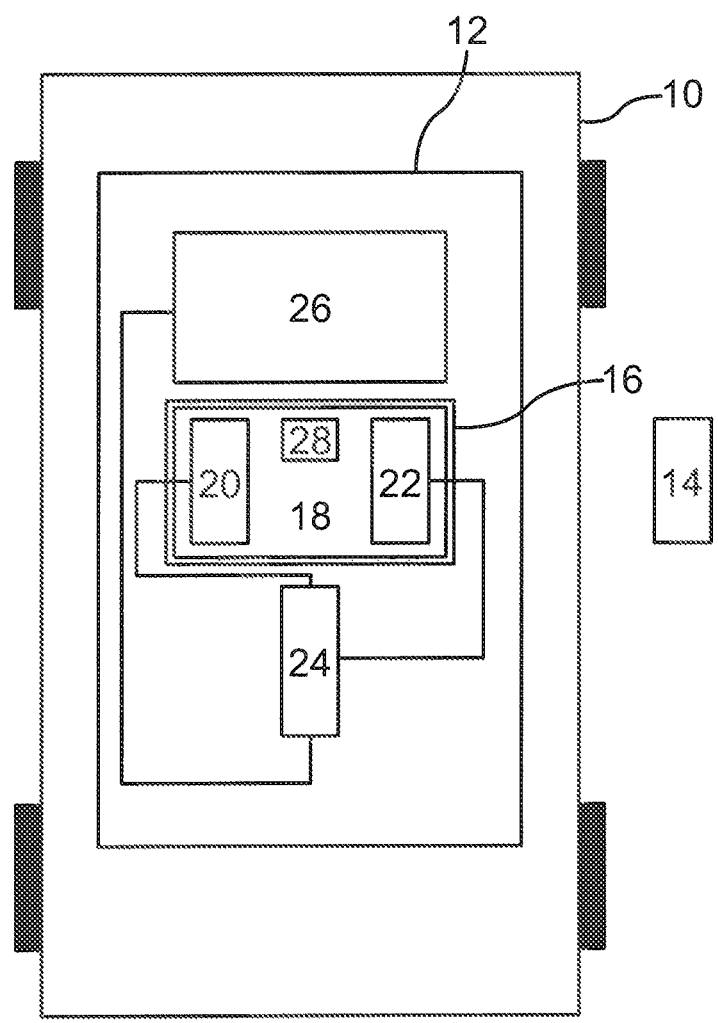
FIG. 1 illustrates a schematic representation of a motor vehicle having a holding fixture for at least one mobile device.

It is the object of the present invention to provide a better holding of at least one mobile device in a motor vehicle.

This objective is achieved by a method for operating a holding fixture, by a holding fixture, and by a motor vehicle having a holding fixture comprising the features of the independent claims. Advantageous embodiments having useful and non-trivial further developments of the invention are indicated in the dependent claims.

In the method according to the invention for the operation of a holding fixture for at least one mobile device, it is determined whether the mobile device is inserted into a receptacle slot in a motor vehicle component. If the mobile device is inserted into the receptacle slot, a drive unit is controlled by a control device in such a manner that, the mobile device is moved by the drive unit into a stowage position in which the mobile device is at least partially lowered into the holding fixture and is held securely. The method according to the invention is unique in that, if a predetermined condition of the vehicle is detected, the drive unit is controlled by the control device so that the mobile device is moved by the drive unit from the stowage position into a removal position, in which the mobile device projects farther out of the receptacle slot than it does in the stowage position.

In the solution according to the invention, a mobile device is not only safely stowed within a motor vehicle, but a way to remind the occupants to take the mobile device when leaving the vehicle is also provided by automatically moving the mobile device from the receptacle slot into a removal position. The mobile device is thus automatically moved into the stowage position as soon as it is inserted into the receptacle slot. For example, the drive unit can then be directly controlled to pull the mobile device into the receptacle slot down to the stowage position as soon as it is detected that the mobile device has been partially inserted into the receptacle slot. This can be detected via a light barrier, for example. Alternately, it is possible that the drive unit can be activated to draw the mobile device into the receptacle slot down to the stowage position only when the mobile device is moved against a stop inside the receptacle slot that is provided with a sensor.

In the stowage position, the mobile device is held securely, thus affixed to the motor vehicle. Any undesired movement of the mobile device or even movement out of the receptacle slot is thereby prevented. The mobile device is locked in the stowage position in all three spatial directions, so it can no longer be translationally moved. Rotational movements as well are not possible in the stowage position.

In addition, the mobile device is automatically moved as soon as at least one predetermined vehicle condition is detected from the stowage position—immersed and fixed in the receptacle slot—into the removal position. In the removal position, the mobile device is no longer affixed to the vehicle in at least one predetermined removal direction—for example in the vertical direction—so that the mobile device can be removed from the receptacle slot by one of the vehicle's occupants. Thus the mobile device can either be positioned actually loose in the removal position; or the mobile device can also still be held with a predetermined force using a holding means correspondingly designed for this, which, in any case, can be set so low that the mobile device can be removed from the receptacle slot without a great effort on the part of one of the vehicle's occupants. The mobile device is not only automatically moved into the receptacle slot, it is also automatically—thus without any operation required on the part of one of the vehicle's occupants—at least partially moved out of the receptacle slot until it reaches the removal position.

In an advantageous embodiment, provision is made for the mobile device to be moved from the stowage position into the removal position as soon as the motor vehicle's door is opened and/or the motor vehicle's ignition is deactivated. Thus, it can easily be concluded whether one or more motor vehicle occupants will probably leave the vehicle, so that the mobile device is moved from the stowage position back to the removal position at the appropriate time by the drive unit, thereby alerting one or more motor vehicle occupants in an effective manner to take their mobile device along when leaving the motor vehicle.

Another advantageous embodiment of the invention provides that the control unit controls a display device in the motor vehicle to display a notification instructing to remove the mobile device as soon as the predetermined vehicle condition is detected. By this, the motor vehicle's occupants are informed or reminded to take the mobile device placed in the receptacle slot with them upon exiting the motor vehicle and not to forget it. Alternately or additionally, it can also be provided that the control device drives an actuator to apply a predetermined resistance on at least one motor vehicle door against its opening direction should the mobile device not yet have been removed from the receptacle slot after the predetermined vehicle condition is detected. Thus, vehicle occupants can be notified or reminded to take their mobile device with them upon exiting the motor vehicle. The resistance applied to the motor vehicle door will be removed as soon as it is detected that the mobile device has been removed from the receptacle slot.

In another advantageous embodiment of the invention, it is provided that at least one interface—in particular a charging interface for charging the mobile device and/or a data interface for connecting the mobile device to the motor vehicle—is connected, that is coupled, to at least one corresponding interface of the mobile device as soon as the mobile device has been placed in the stowage position. In other words, the control device is designed to control a supply device such that at least one on-board interface—for example a charging cable to charge the mobile device and/or a data cable to connect the mobile device to the motor vehicle—leads to at least one corresponding interface of the mobile device and is connected to it as soon as it has been detected that the mobile device has been placed in the stowage position. Manual actions on the part of the vehicle's occupants for charging and, if necessary, for connecting the mobile device to the motor vehicle can thus be omitted because these occur automatically as soon as the mobile device is placed in the stowage position by the drive unit.

According to another advantageous embodiment of the invention, it is provided that the control device is designed to control a locking device so that, as soon as it has been detected that the mobile device has been fully retracted into its stowage position within the receptacle slot, the receptacle slot is closed via the locking device. In this manner, the mobile device can be especially securely enclosed within the receptacle slot. Alternatively or in addition, it is also possible that the holding fixture has an adjustable locking means that can be attached to the mobile device for its secure holding or fixing as soon as the mobile device has been placed in the stowage position. For example, the drive unit can be designed in such a way that suitable drive means are configured to move the mobile device as well as to securely hold the mobile device. By this, it can also be assured that the mobile device is held securely in its stowage position.

The holding fixture according to the invention for at least one mobile device includes a receptacle slot configured in a motor vehicle component for holding the mobile device. Additionally, the holding fixture includes a detection device which is designed to detect whether the mobile device has been placed in the receptacle slot. In addition, the holding fixture has a drive unit by means of which the mobile device can be moved into a stowage position that is at least partially lowered in the receptacle slot in which the mobile device is securely held. Further, the holding fixture includes a control device that is designed to control the drive unit in such a manner that the mobile device is moved into its stowage position that is at least partially lowered within the receptacle slot by the drive unit and securely held if the mobile device is placed in the receptacle slot. The holding fixture according to the invention is unique in that the control device is designed to control the drive unit so that the mobile device is moved by the drive unit from the stowage position into a removal position in which the mobile device projects farther out of the receptacle slot than it does in the stowage position if a predetermined vehicle condition is detected. Advantageous embodiments of the method according to the invention can be regarded as advantageous embodiments of the holding fixture according to the invention, the holding fixture having, in particular, means for performing the steps of the method.

In an advantageous embodiment of the holding fixture, it is provided that inside the receptacle slot at least one interface, in particular a charging interface for charging the mobile device and/or a data interface for connecting the mobile device to the motor vehicle, is connected to at least one corresponding interface of the mobile device if the mobile device has been placed in the stowage position. In other words, the mobile device is automatically coupled by its corresponding interface to the vehicle interface as soon as the mobile device is placed in the stowage position. That means that automatic coupling of the mobile device to at least one of the appropriate on-board interfaces occurs as soon as the device is placed in the stowage position. The vehicle occupants thus need not perform any manual coupling of the mobile device to, for example, charging cables or data cables.

An additional advantageous embodiment of the holding fixture provides that the holding fixture contains a holding element designed to hold the mobile device that is movable by a drive unit between the removal position and the stowage position. Using such a holding element, the device can be held particularly securely in the removal position as well as in the stowage position and moved accordingly by the drive unit.

An additional advantageous embodiment of the holding fixture provides that the drive unit has a plurality of rollers in the receptacle slot that are arranged opposite each other with which the mobile device is moved between the removal position and the stowage position. The rollers are preferably rubberized or girded with foam so that the mobile device is not damaged. Using the rollers, the mobile device can be moved easily back and forth between the removal position and the stowage position.

Furthermore, the holding fixture can have an adjusting device by which the holding fixture is customizable for differently sized devices. The adjusting device can be integrated, for example, into the receptacle slot so that using the adjusting device the width, length, or height of the receptacle slot can be adapted to the specific dimensions of different mobile devices. The adjusting device may include, for example, a spring mechanism, so that by the spring mechanism, a simple adaptation to different sizes of mobile devices can be easily accomplished.

Alternately or in addition, the receptacle slot can be of dimensions large enough that several mobile devices can be securely positioned in the receptacle slot at the same time. The receptacle slot can, for example, be of dimensions large enough that a smart phone as well as a tablet computer can be accommodated in the receptacle slot, at least on an individual basis. By both the appropriately large dimensions of the receptacle slot as well as by the provision of an adjustment device, the holding fixture can be used very variably for a wide range of mobile devices.

The motor vehicle according to the invention comprises the holding fixture according to the invention or an advantageous embodiment of the holding fixture according to the invention.

Further advantages, features and details of the invention arise from the following description of advantageous exemplary embodiments, as well as with reference to the drawing. The features and feature combinations mentioned above in the description, as well as the features and feature combinations mentioned below in the description of the drawing and/or mentioned only in the figures, can be used in the specified combination, but also in other combinations or alone without exceeding the scope of the invention.

Figure 2:
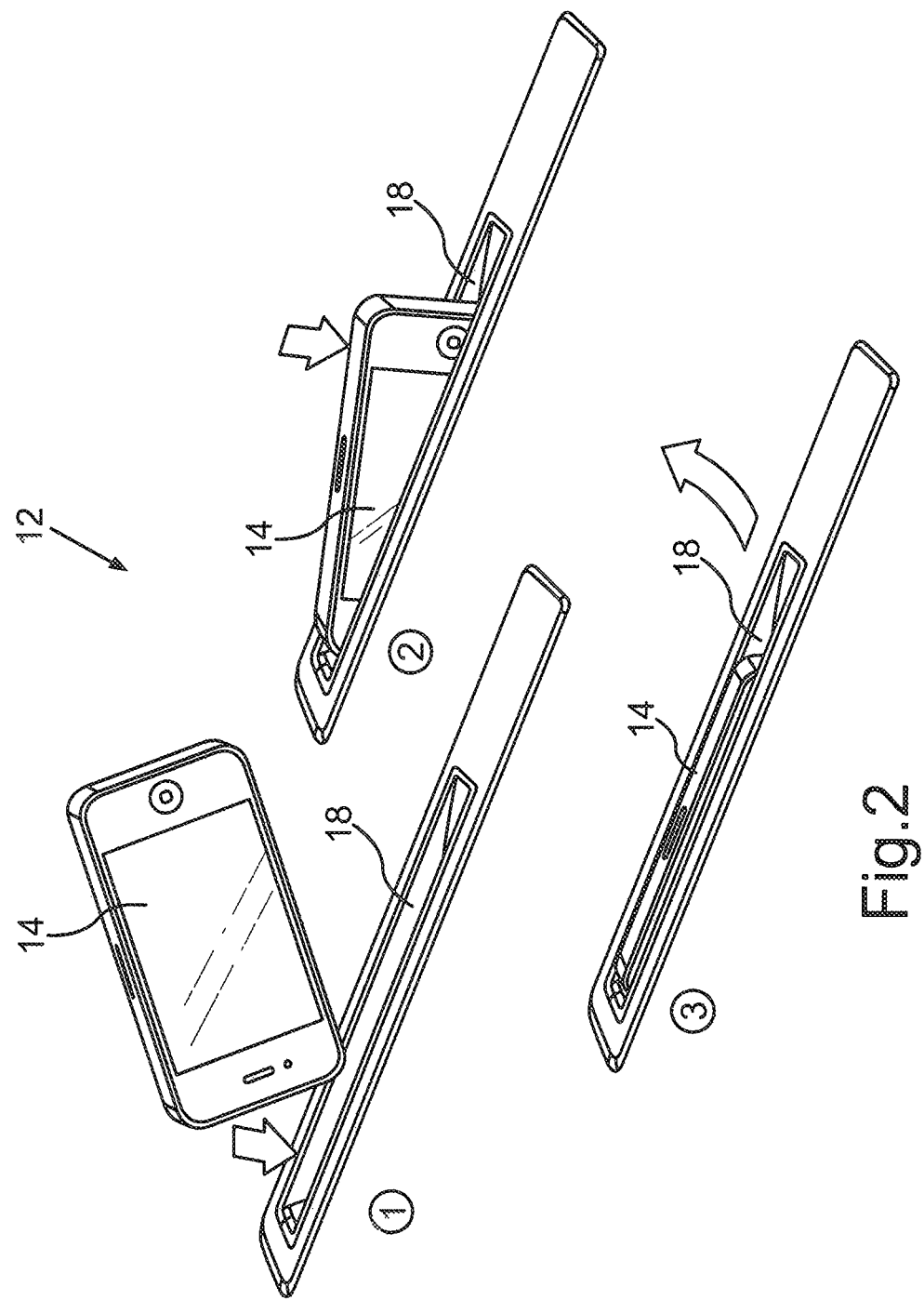
FIG. 2 illustrates a perspective view of a first embodiment of the holding fixture where the holding fixture is shown in three different states, in which, first of all, a smart phone is placed straight in a receptacle slot of the holding fixture, then lowered into the receptacle slot by a drive unit (not depicted) and, finally, moved into a fully lowered stowage position.
Figure 3:
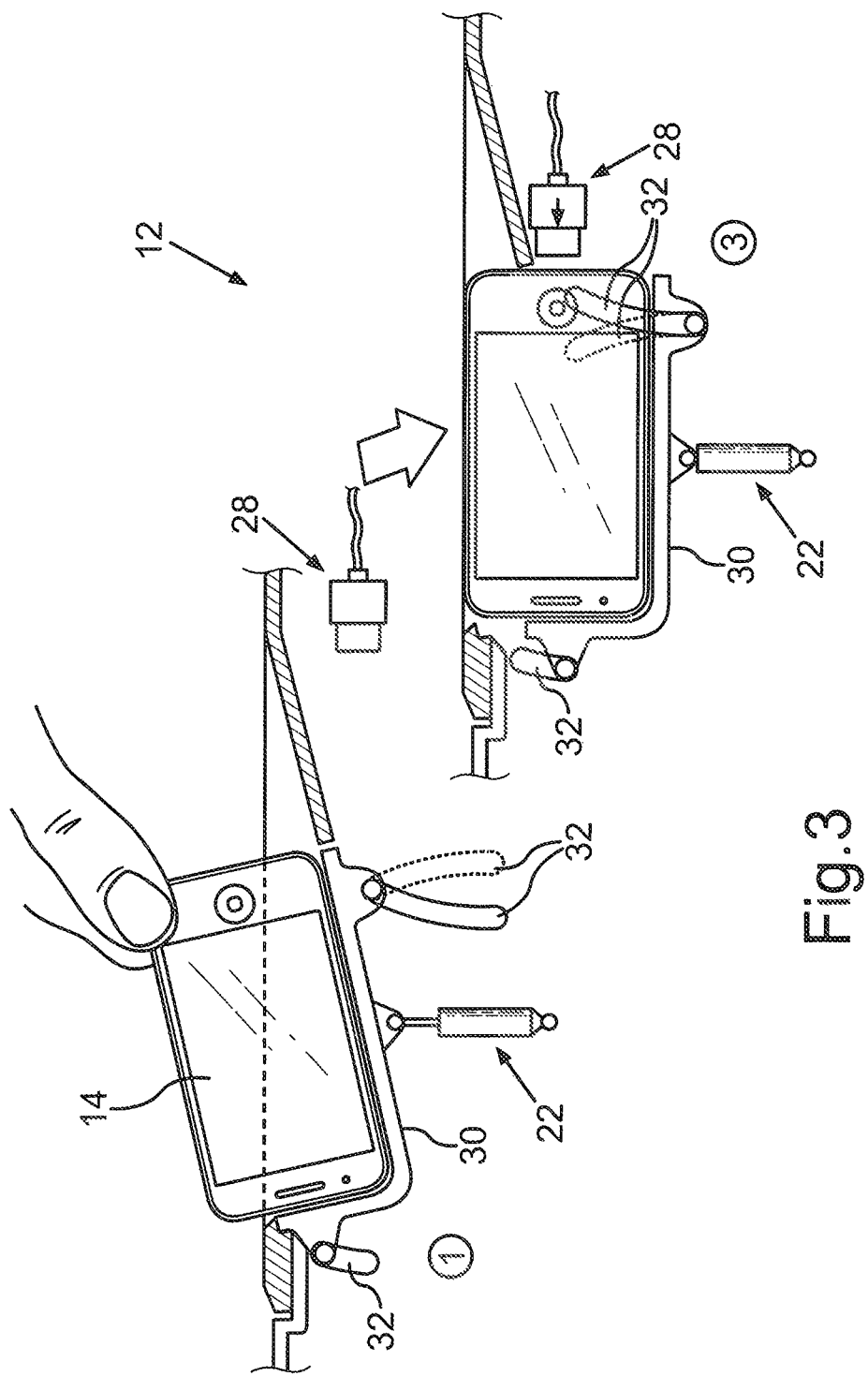
FIG. 3 illustrates a partially cut-away side view of a holding fixture, where a first embodiment shows a possible drive unit for moving the smart phone and the smart phone is shown once in its stowage position and once in its removal position.
Figure 4:
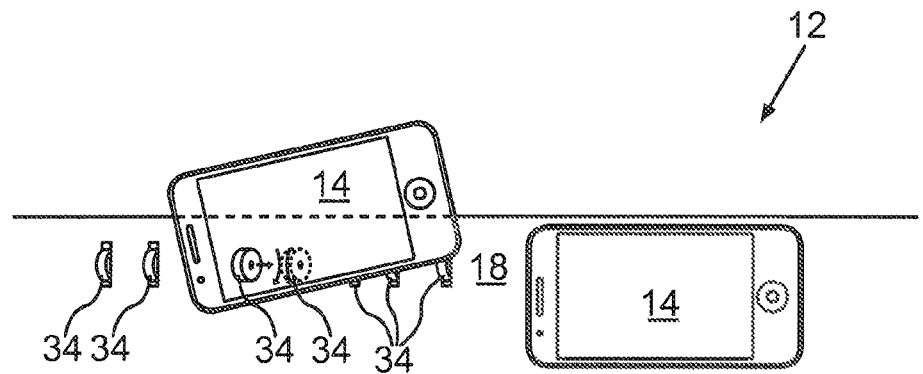
FIG. 4 illustrates a schematic side view of an alternative embodiment of the drive unit, where the drive unit has a plurality of rollers to move the smart phone.
Figure 5:
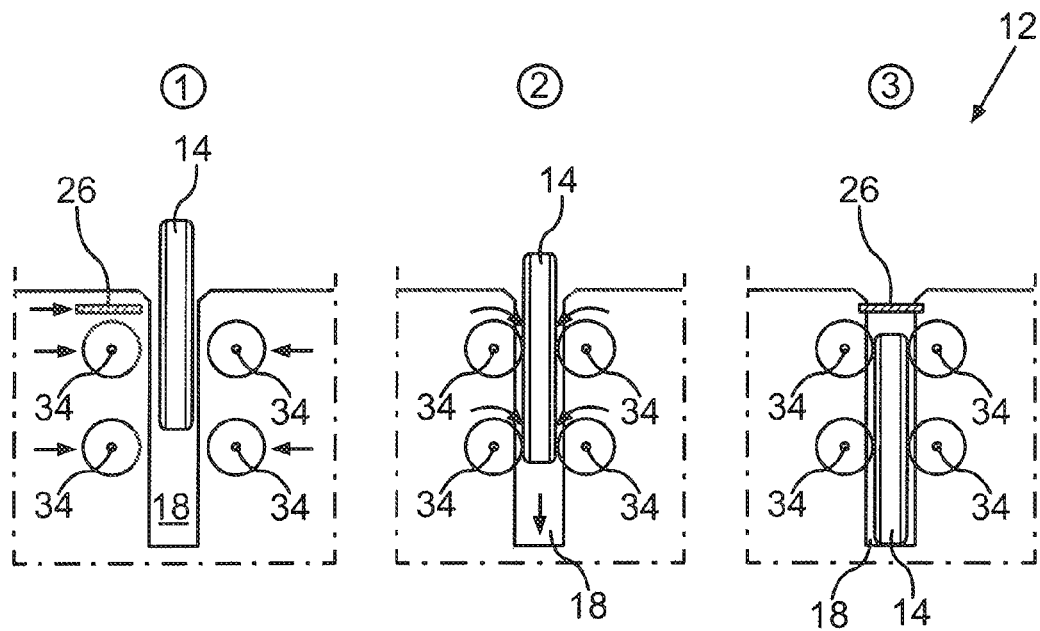
FIG. 5 illustrates a cut-away top view of the drive unit with the plurality of rollers, where the smart phone is again depicted being inserted into the receptacle slot, being moved into the receptacle slot and in its stowage position.
Figure 8:
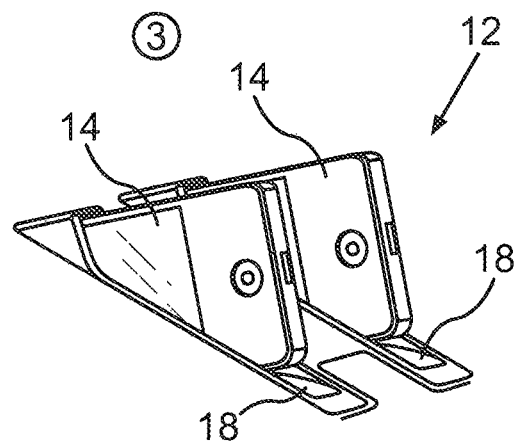
FIG. 8 illustrates a possible arrangement of two smart phones in two receptacle slots of the holding fixture.
Figure 9:
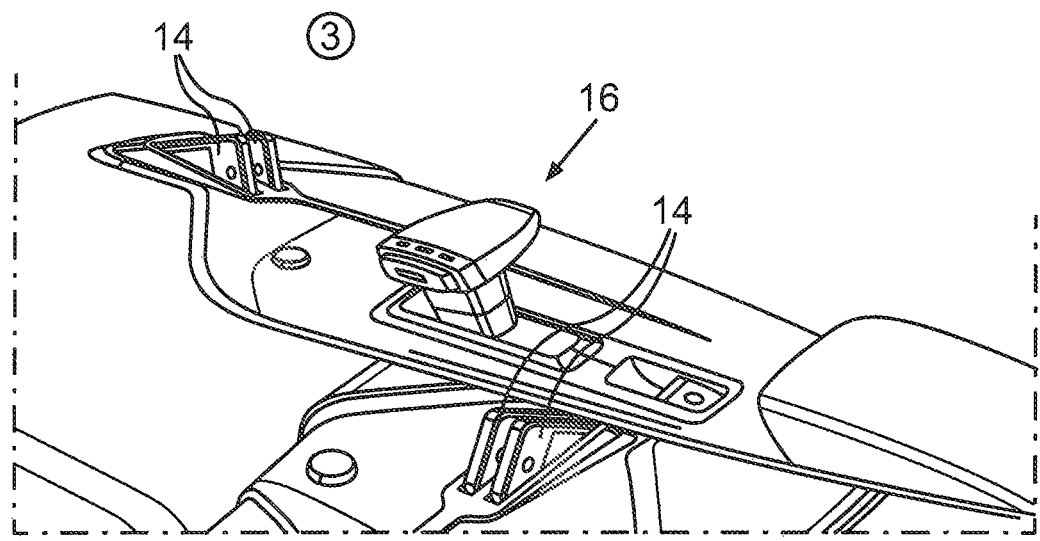
FIG. 9 illustrates a perspective view of the center tunnel of a motor vehicle, where several receptacle slots are provided within the center tunnel and in which smart phones are respectively arranged.

The drawing shows the following:

FIG. 1 a schematic representation of a motor vehicle having a holding fixture for at least one mobile device;

FIG. 2 a perspective view of a first embodiment of the holding fixture where the holding fixture is shown in three different states, in which, first of all, a smart phone is placed straight in a receptacle slot of the holding fixture, then lowered into the receptacle slot by a drive unit (not depicted) and, finally, moved into a fully lowered stowage position;

FIG. 3 a partially cut-away side view of a holding fixture, where a first embodiment shows a possible drive unit for moving the smart phone and the smart phone is shown once in its stowage position and once in its removal position;

FIG. 4 a schematic side view of an alternative embodiment of the drive unit, where the drive unit has a plurality of rollers to move the smart phone;

FIG. 5 a cut-away top view of the drive unit with the plurality of rollers, where the smart phone is again depicted being inserted into the receptacle slot, being moved into the receptacle slot and in its stowage position;

FIG. 6 a perspective view of a motor vehicle door, where the receptacle slot of the holding fixture in the embodiment shown here is integrated into the motor vehicle door;

FIG. 7 a sectional view of the holding fixture shown in FIG. 6, where the smart phone is again shown being inserted into the receptacle slot, being moved into the receptacle slot and in its stowage position;

FIG. 8 a possible arrangement of two smart phones in two receptacle slots of the holding fixture; and FIG. 9 a perspective view of the center tunnel of a motor vehicle, where several receptacle slots are provided within the center tunnel and in which smart phones are respectively arranged.

In the figures, the same or functionally equivalent elements are provided with the same reference characters.

A car 10 is shown in a schematic drawing in FIG. 1. The car 10 includes a holding fixture 12 for at least one mobile device 14, the holding fixture 14 having a receptacle slot 18 formed in one motor vehicle component 16 to hold the mobile device 14. The mobile device can, for example, be a smart phone or a tablet computer. Moreover, the holding fixture 12 includes a detection device 20 which is designed to detect whether the mobile device 14 has been placed in the receptacle slot 18.

Further, the holding fixture 12 has a drive unit 22, by means of which the mobile device 14 can be moved into a stowage position that is at least partially lowered within the receptacle slot 18 in which the mobile device 14 is securely held. Additionally, the holding fixture 12 includes a control unit 24, which is designed to control the drive unit 22 in such a manner that the mobile device 14 is moved by the drive unit 22 into the stowage position if the mobile device 14 is inserted into the receptacle slot 18. Furthermore, the control unit 24 is designed to control the drive unit 22 such that the mobile device 14 is moved by the drive unit 22 from the stowage position back into a removal position in which the mobile device 14 projects farther out of the receptacle slot 18 than it does in the stowage position if a predetermined vehicle condition is detected.

Preferably, the mobile device 14 is moved from the stowage position into the removal position as soon as a motor vehicle door is opened and/or the ignition of the motor vehicle is deactivated. A vehicle occupant who had previously safely stowed his mobile device 14 into the receptacle slot 18 is thus reminded in a simple manner before leaving the motor vehicle 10 to take his mobile device 14 before he/she leaves the vehicle 10.

To remind the vehicle occupant to take his/her mobile device 14 when leaving the vehicle, it can additionally be provided that the control unit 24 controls an indicating device (not depicted) in the motor vehicle 10—for example, a central display above a central console—to display a communication directing the removal of the mobile device as soon as the predetermined condition of the vehicle has been detected. For example, a message will be shown on the indicating device that the mobile device 14 is still in the receptacle slot 18. Alternately or additionally, it can also be provided that an acoustic notification is emitted by which the vehicle occupant is notified that the mobile device 14 is still in the receptacle slot 18.

Additionally or alternately, it can also be provided that the control device 24 controls an actuator to apply a predetermined resistance on at least one motor vehicle door against its opening direction, should the mobile device 14 not yet have been removed from the receptacle slot 18 after the predetermined vehicle condition is detected. This also serves as a notice or reminder to the vehicle occupant that he/she should not forget his/her mobile device 14 in the motor vehicle 10.

In addition, the holding fixture 12 can also have a locking device 26, where the control device 24 is designed to activate a locking mechanism 26 in such a manner that, using the locking mechanism, the receptacle slot 18 is closed as soon as it is detected that the mobile device 14 has been placed in the stowage position fully lowered in the receptacle slot 18.

Inside the receptacle slot 18 at least one interface 28, in particular a charging interface for charging the mobile device 14 and/or a data interface for connecting the mobile device 14 to the motor vehicle 10, can additionally be connected in such a manner that the interface 28 is coupled to a corresponding interface of the mobile device 14 if the mobile device 14 has been placed in the stowage position inside the receptacle slot 18. Thus, a vehicle occupant need connect neither a charging cable nor a data cable to the mobile device 14, since the mobile device 14 is automatically connected to such an interface as soon as the mobile device 14 is placed in the stowage position.

Alternatively, it is also possible for the interface 28 to be connected to at least one corresponding interface on the mobile device 14 as soon as the mobile device 14 is placed in the stowage position. For example, the control device 24 can be designed so that it controls an appropriately designed feed device that leads to a corresponding on-board interface 28 which leads to and is connected to a corresponding interface on the mobile device 14 as soon as it is detected that the mobile device 14 has been placed in the stowage position.

FIG. 2 shows a schematic representation of a first possible embodiment of the holding fixture 10. There are thus three different conditions 1, 2, and 3, according to which the mobile device 14, which is in this case a smart phone, can be positioned with respect to the holding fixture 10. 1 is marked as a removal position; 2 as a state in which the mobile device 14 is moved into the receptacle slot 18 by a drive unit 22; and 3 as a mobile device stowage position inside the receptacle slot 18. These markings 1, 2 and 3 are valid also in the following figures. In FIG. 2, the removal position 1 is not entirely correctly represented. Here, the passenger has just placed the mobile device 14 in the receptacle slot 18.

First, the passenger places the mobile device 14 in the slot 18, where it is recognized by the detection device 20 (schematically shown in FIG. 1) that the mobile device 14 has just been placed in the receptacle slot 18. Using the drive unit 22, the mobile device 14 is then pulled or moved into the slot 18 until the mobile device 14 is fully lowered in the receptacle slot 18 in its stowage position. As soon as a motor vehicle door is opened and/or the ignition of the motor vehicle 10 is deactivated, the mobile device 14 is again moved automatically from the stowage position into the removal position indicated with the number 3.

FIG. 3 shows a partially cut-away view of the procedure shown in FIG. 2. As can be seen, the holding fixture 10 in the embodiment shown here encompasses a holding element 30 which is designed in a generally L-shaped form to hold the mobile device 14. In the embodiment shown here, it can, for example, be provided that the mobile device 14 is first moved into the stowage position as soon as the mobile device 14 is positioned on the holding element 30. As an example, a sensor (not depicted) can be arranged on the holding element 30 by which it can be detected that the mobile device 14 has just been inserted in the receptacle slot 18 and positioned on the holding element 30.

The adjusting device 22 is here designed as a type of lifting cylinder by which the mobile device 14 can be moved into the stowage position. In order to allow a guided movement of the holding element 30 and with it also of the mobile device 14, the holding fixture 10 has a slotted guide 32 along which the movement of the holding element 30 can be guided from the removal position into the stowage position and vice versa.

In the exemplary embodiment presently shown in FIG. 3, the mobile device 14 is placed crosswise so that the interface (not specified in detail here) of the mobile device 14 is found to the right in the present drawing. As soon as the mobile device 14 is moved into the stowage position, the interface 28—which is a combination of a data and charging cable—is guided to the mobile device 14 and connected to the interface on the mobile device 14.

A further alternative embodiment of the holding fixture 12 is shown in FIG. 4. In this case, the receptacle slot 18 has dimensions large enough that two mobile devices 14 can simultaneously be accommodated in the receptacle slot 18. Rollers 34 are here present on each opposing side of the receptacle slot 18, by which the mobile device 14 can be moved between the removal position and the stowage position.

FIG. 5 shows the embodiment of the holding fixture 12 described in FIG. 4 in a cut-away top view, where one of the two mobile devices 14 is depicted first to the very left in the removal position, in the middle during the movement of the mobile device 14 into the stowage position and all the way to the right in its stowage position. The rollers 34 can, for example, be arranged and mounted in such a way that they can be moved inwards in the direction of the receptacle slot 18 and out of it, in particular crosswise with respect to the mobile device 14.

As soon as it is detected that the mobile device 14 is moved into the receptacle slot, the control device 24 can control an appropriate adjustment mechanism so that the rollers 34 are moved on the mobile device 14 until these rollers 34 rest against the mobile device 14. Next, the control device 24 controls the rollers 34 in such a manner that they move the mobile device 14 from the removal position into the stowage position, thus, into the receptacle slot 18. The rollers 34 can thus perform a dual function: first to move the mobile device 14 and secondly to secure the mobile device 14. In the exemplary embodiment shown here, the mobile device 14 is fully lowered in the receptacle slot 18. Once the mobile device 14 has been fully lowered in the receptacle slot 18—thus, in its stowage position—the locking device 26 is activated so that it fully closes the receptacle slot 18 and thus securely prevents the mobile device 14 from accidentally moving or falling out of the receptacle slot 18.

FIG. 6 shows a further alternative embodiment of the holding fixture 12. In this case, the receptacle slot 18 is integrated into a vehicle door 36, so that the mobile device 14 can be lowered within the vehicle door.

FIG. 7 shows the embodiment of the holding fixture 12 shown in FIG. 6 in three cross-sections where the mobile device 14 again is shown in the removal position, during movement into the stowage position and in the stowage position. As can be seen, the receptacle slot 18 is here tapered on its upper side as well as on its lower side which helps position the mobile device 14 especially precisely inside the receptacle slot 18. In this case, the drive unit 22 (not indicated here in detail) again has a plurality of rollers 34 by which the mobile device 14 can be moved back and forth between the removal position and the stowage position. As can be seen, the interface 28 is placed within the receptacle slot 18 in such a manner that the mobile device 14 in its stowage position is automatically coupled to the interface 28.

FIG. 8 shows a further alternative embodiment of the holding fixture 12 in which two mobile devices 14 are shown in the stowage position. In this case, the stowage position is selected such that the mobile device 14 projects from the receptacle slot 18 like a shark's fin. The receptacle slot 18 can thus be used in combination with the mobile device 14 as a kind of design/technical element within the interior of the motor vehicle.

FIG. 9 shows part of a central tunnel 38 in a perspective view. As can be seen here, a plurality of mobile devices 14 is arranged in receptacle slots 18 (not specified in detail here). The mobile devices 14 shown here in their stowage position also protrude like sharks' fins from their respective receptacle slots 18. The receptacle slots 18 thus also serve as a sort of design element within the interior of the motor vehicle.

The invention claimed is:

1. A method for operating a holding fixture for a mobile device, the method comprising:
   determining whether the mobile device is inserted into a receptacle slot of a motor vehicle component;
   in response to determining that the mobile device is inserted into the receptacle slot, controlling a drive unit by a control device in such a manner that the mobile device is moved by the drive unit into a stowed position, wherein the mobile device is at least partially lowered into the receptacle slot and securely held in the stowed position; and
   in response to detecting a predetermined vehicle condition, controlling the drive unit by the control device in such a manner that the mobile device is moved via the drive unit from the stowed position into a removal position,
   wherein the mobile device protrudes farther out of the receptacle slot in the removal position than the mobile device does in the stowed position,
   wherein the predetermined vehicle condition is a motor vehicle door opening or an ignition of a motor vehicle being deactivated,
   wherein a display device in the motor vehicle is activated by the control device to display a notification instructing to remove the mobile device in response to detecting the predetermined vehicle condition, and
   wherein a locking mechanism is activated by the control device such that the receptacle slot is closed in response to detecting the mobile device to have been placed in the stowed position fully lowered in the receptacle slot.

2. The method of claim 1, further comprising:
   connecting a charging interface, for charging the mobile device, or a data interface, for connecting the mobile device to the motor vehicle, to at least one corresponding interface of the mobile device in response to the mobile device having been placed in the stowed position.

3. A holding fixture for a mobile device comprising:
   a receptacle slot built into a motor vehicle component and configured to hold the mobile device;
   a detection device configured to detect whether the mobile device has been placed in the receptacle slot;
   a drive unit configured to move the mobile device into an at least partially lowered stowage position in the receptacle slot in which the mobile device is securely held; and
   a control device configured to control the drive unit in such a manner that the mobile device is moved into the stowage position in response to detecting that the mobile device is placed in the receptacle slot,
   wherein the control device is further configured to control the drive unit to move the mobile device from the stowage position into a removal position in which the mobile device projects farther out of the receptacle slot than the mobile device does in the stowage position in response to detecting a predetermined vehicle condition,
   wherein the predetermined vehicle condition is a motor vehicle door opening or an ignition of a motor vehicle being deactivated,
   wherein the control device is further configured to control a display device in the motor vehicle to display a notification instructing to remove the mobile device in response to detecting the predetermined vehicle condition, and
   wherein the control device is further configured to activate a locking mechanism such that the receptacle slot is closed in response to detecting the mobile device to have been placed in the stowage position fully lowered in the receptacle slot.

4. The holding fixture of claim 3, further comprising:
   a charging interface inside the receptacle slot configured to charge the mobile device, wherein the charging interface is arranged in such a way that the charging interface is connected to a corresponding interface of the mobile device in response to the mobile device having been placed in the stowage position.

5. The holding fixture of claim 3, further comprising:
   a holding element configured to hold the mobile device and configured to be moved between the removal position and the stowage position via the drive unit.

6. The holding fixture of claim 3, wherein the drive unit comprises:
   a plurality of rollers arranged opposite each other in the receptacle slot, the plurality of rollers configured to move the mobile device between the removal position and the stowage position.

7. The holding fixture of claim 3, further comprising:
   a data interface inside the receptacle slot configured to connect the mobile device to the motor vehicle, wherein the data interface is arranged in such a way that the data interface is connected to a corresponding interface of the mobile device in response to the mobile device having been placed in the stowage position.

8. A motor vehicle comprising:
   a receptacle slot built into a motor vehicle component and configured to hold a mobile device;
   a sensor configured to detect whether the mobile device has been placed in the receptacle slot;
   a drive unit configured to move the mobile device into an at least partially lowered stowage position in the receptacle slot in which the mobile device is securely held; and a control device configured to control the drive unit in such a manner that the mobile device is moved into the stowage position in response to detecting that the mobile device is placed in the receptacle slot, wherein the control device is further configured to control the drive unit to move the mobile device from the stowage position into a removal position in which the mobile device projects farther out of the receptacle slot than the mobile device does in the stowage position in response to detecting a predetermined vehicle condition, wherein the predetermined vehicle condition is a motor vehicle door opening or an ignition of the motor vehicle being deactivated, wherein the control device is further configured to control a display device in the motor vehicle to display a notification instructing to remove the mobile device in response to detecting the predetermined vehicle condition, and wherein the control device is further configured to activate a locking mechanism such that the receptacle slot is closed in response to detecting the mobile device to have been placed in the stowage position fully lowered in the receptacle slot.

9. The motor vehicle of claim 8, further comprising:
a charging interface inside the receptacle slot configured to charge the mobile device, wherein the charging interface is arranged in such a way that the charging interface is connected to a corresponding interface of the mobile device in response to the mobile device having been placed in the stowage position.

10. The motor vehicle of claim 8, further comprising:
a holding element configured to hold the mobile device and configured to be moved between the removal position and the stowage position via the drive unit.

11. The motor vehicle of claim 8, wherein the drive unit comprises:
a plurality of rollers arranged opposite each other in the receptacle slot, the plurality of rollers configured to move the mobile device between the removal position and the stowage position.

12. The motor vehicle of claim 8, further comprising:
a data interface inside the receptacle slot configured to connect the mobile device to the motor vehicle, wherein the data interface is arranged in such a way that the data interface is connected to a corresponding interface of the mobile device in response to the mobile device having been placed in the stowage position.

* * * * *